United States Patent [19]

Flexman

[11] Patent Number: 5,344,882
[45] Date of Patent: Sep. 6, 1994

[54] POLYACETAL BLENDS

[75] Inventor: Edmund A. Flexman, Wilmington, Del.

[73] Assignee: E. I. Du Pont de Nemours and Company, Wilmington, Del.

[21] Appl. No.: 12,776

[22] Filed: Jan. 27, 1993

Related U.S. Application Data

[63] Continuation-in-part of Ser. No. 548,682, Jun. 22, 1990, abandoned.

[51] Int. Cl.$^5$ ............ C08L 59/00; C08L 67/00; C08L 75/00; C08L 77/06
[52] U.S. Cl. ............ 525/131; 525/154; 525/399; 525/400
[58] Field of Search ............ 525/399, 400, 131, 154

[56] References Cited

U.S. PATENT DOCUMENTS

| | | | |
|---|---|---|---|
| 3,960,984 | 6/1976 | Kohan | 525/411 |
| 4,080,356 | 3/1978 | Gergen et al. | 525/399 |
| 4,097,446 | 6/1978 | Abolins et al. | 260/40 R |
| 4,277,577 | 7/1981 | Burg et al. | 525/131 |
| 4,535,127 | 8/1985 | Matsuzaki et al. | 525/154 |
| 4,640,949 | 2/1987 | Wagman | 524/227 |
| 4,804,716 | 2/1989 | Flexman, Jr. | 525/399 |
| 4,845,161 | 7/1989 | Richardson | 525/399 |
| 4,873,282 | 10/1989 | Yui et al. | 525/154 |
| 4,978,725 | 12/1990 | Reske et al. | 525/399 |

FOREIGN PATENT DOCUMENTS

| | | | |
|---|---|---|---|
| 0117664 | 9/1984 | European Pat. Off. | |
| 0120711 | 10/1984 | European Pat. Off. | |
| 0290761 | 11/1988 | European Pat. Off. | |
| 290761 | 11/1988 | Fed. Rep. of Germany | |
| 3802753 | 8/1989 | Fed. Rep. of Germany | |
| 63-126709 | 5/1988 | Japan | |
| 8103027 | 10/1981 | PCT Int'l Appl. | |
| 9118051 | 11/1991 | PCT Int'l Appl. | 525/399 |

Primary Examiner—James J. Seidleck
Assistant Examiner—Thomas Hamilton, III

[57] ABSTRACT

Incorporation of a thermoplastic polyurethane and at least one thermoplastic crystalline polymer selected from nylon 6, nylon 612, polypropylene, and polyalkylene terephthalates containing at least one ethylene copolymer into polyacetal polymer results in blends characterized as having improved toughness, or impact strength, and improved elongation over that of a comparable blend of polyacetal and at least one of said crystalline polymers alone.

14 Claims, No Drawings

POLYACETAL BLENDS

CROSS REFERENCE TO RELATED APPLICATION

This application is a continuation-in-part of U.S. patent application Ser. No. 07/548,682, filed Jun. 22, 1990, now abandoned.

BACKGROUND

Technical Field

The present invention relates to polyacetal-based blends containing a polyacetal polymer, a thermoplastic polyurethane, and at least one thermoplastic crystalline polymer selected from the group consisting of nylon 612, nylon 6, polypropylene, and certain polyalkylene terephthalates containing certain ethylene copolymers. The blends are characterized as having improved toughness and improved elongation over that of a comparable blend of the polyacetal and the thermoplastic crystalline resin in the absence of the thermoplastic polyurethane.

Polyacetal compositions, which are also referred to in the art as polyoxymethylene compositions, are generally understood to include compositions based on homopolymers of formaldehyde or of cyclic oligomers of formaldehyde, for example, trioxane, the terminal groups of which are end-capped by esterification or etherification, as well as copolymers of formaldehyde or of cyclic oligorners of formaldehyde, with oxyalkylene groups with at least two adjacent carbon atoms in the main chain, the terminal groups of which copolymers can be hydroxyl terminated or can be end-capped by esterification or etherification. The proportion of the comonomers can be up to 20 weight percent.

Compositions based upon polyacetal of relatively high molecular weight, i.e., 20,000 to 100,000 are useful in preparing semi-finished and finished articles by any of the techniques commonly used with thermoplastic materials, e.g., compression molding, injection molding, extrusion, blow molding, melt spinning, stamping, and thermoforming. Finished products made from such polyacetal compositions possess extremely desirable physical properties, including high stiffness, strength, and solvent resistance.

Crystalline thermoplastic resins also have many useful properties and enjoy wide commercial acceptance. With the increased concern about discarding plastic materials rather than recycling such materials, it has become more socially responsible to re-use plastic materials, or to use scrap plastic materials, rather than simply disposing of such materials. However, scrap plastic materials often contain more than one type of plastic material. Re-use of such scrap plastic materials normally requires that the individual components of the plastic scrap be segregated. This is an expensive step. As such, it has become desirable to find a way to merely mix together scrap plastic materials, without segregating the components of the scrap material, and form therefrom useful objects having good physical properties. It has long been recognized, however, by those skilled in the art of blending technology, that blends prepared from only two different types of resins often have such reduced physical properties that they are precluded from being useful. As such, partly due to the desire to find uses for scrap plastic materials, which often inherently contain more than one type of resin, efforts are being made to find polymers that are sufficiently compatible with each other that they can be blended together without suffering a significant losses in physical properties.

Polyacetal has been among the last of the crystalline engineering resins to be blended with other resins. Commercial blends of polyacetal and other resins, for purposes other than toughening, are relatively unknown. Generally, when polyacetal is blended with another resin, the physical properties of the polyacetal are significantly decreased. However, by the present invention, it has been found that polyacetal containing certain thermoplastic crystalline resins, such as would be present in scrap plastic streams, can be blended with thermoplastic polyurethanes and the resultant blend has better toughness and elongation properties than does the scrap polyacetal containing the crystalline resin alone. More significantly, this implies that a means has been found to allow for the recycling of plastic waste streams that contain a major portion of polyacetal and minor portions of certain other common crystalline resins by blending said waste with a thermoplastic polyurethane and forming therefrom objects having useful levels of toughness. Such objects that can be prepared from the blends of the present invention include agricultural and construction objects, such as benches and pallets.

SUMMARY OF THE INVENTION

The present invention relates to polyacetal blends consisting essentially of (a) 30–98 weight percent of a polyacetal, (b) 1–30 weight percent of a thermoplastic polyurethane, and (c) 1–40 weight percent of at least one thermoplastic crystalline polymer selected from the group consisting of nylon 612, nylon 6, polypropylene, and certain polyalkylene terephthalates containing at least one of certain ethylene copolymer, with the above weight percents being based upon the weight of components (a), (b), and (c), only. The blends are characterized as having improved toughness and improved elongation over that of comparable blends of polyacetal with such thermoplastic crystalline resins and without a thermoplastic polyurethane. The blends are useful wherever such improved properties in polyacetal blends are desired and when it is desirous to re-use polyacetal scrap containing such thermoplastic crystalline resins.

DETAILED DESCRIPTION OF THE INVENTION

The present invention relates to blends of a polyacetal polymer with a thermoplastic polyurethane and at least one thermoplastic crystalline polymer selected from the group consisting of nylon 6 12, nylon 6, polypropylene, and certain polyalkylene terephthalates containing at least one of certain ethylene copolymers. The blends are characterized as having improved toughness and improved elongation over that of polyacetal blended with said crystalline resins.

Blend Composition

More specifically, the blends of the present invention consist essentially of a component (a) 30–98 weight percent polyacetal, a component (b) 1–30 weight percent thermoplastic polyurethane, and a component (c) 1–40 weight percent of at least one thermoplastic crystalline polymer selected from the group consisting of nylon 612, nylon 6, polypropylene, and certain polyalkylene terephthalates containing at least one of certain ethylene copolymers. Preferably, the blends consist essentially of 40-95 weight percent of the component (a), 5-25 weight percent of the component (b), and 5-35 weight percent of the component (c). Most preferably, the blends consist essentially of 50-90 weight percent of the component (a), 10-20 weight percent of the component (b), and 10-30 weight percent of the component (c). All the above-mentioned weight percents are based upon the weight of components (a), (b), and (c) only.

Component (a) Polyacetal

The component (a) "polyacetal" includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetals used in the blends of the present invention can be branched or linear and will generally have a number average molecular weight in the range of 10,000 to 100,000, preferably 20,000 to 90,000, and more preferably 25,000 to 70,000. The molecular weight can be conveniently measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the polyacetal with the most desired combination of physical properties in the molded articles made from such blends.

As an alternative to characterizing the polyacetal by its number average molecular weight, it can be characterized by its melt flow rate. Polyacetals which are suitable for use in the blends of the present invention will have a melt flow rate (measured according to ASTM-D-1238, Procedure A, Condition G with a 1.0 mm (0.0413 inch) diameter orifice of 0.1-40 grams/10 minutes. Preferably, the melt flow rate of the polyacetal used in the blends of the present invention will be from 0.5-35 grams/10 minutes. The most preferred polyacetals are linear polyacetals with a melt flow rate of about 1-20 gram/10 minutes.

As indicated above, the polyacetal can be either a homopolymer, a copolymer, or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness and strength. Preferred polyacetal homopolymers include those whose terminal hydroxyl groups have been end-capped by a chemical reaction to form ester or ether groups, preferably acetate or methoxy groups, respectively.

The polyacetal may also contain those additives, ingredients, and modifiers that are known to be added to polyacetal.

Component (b) Thermoplastic Polyurethane

The component (b) thermoplastic polyurethanes suited for use in the blends of the present invention can be selected from those commercially available or can be made by processes known in the art. (See, for example, Rubber Technology, 2nd edition, edited by Maurice Morton (1973), Chapter 17, Urethane Elastomers, D. A. Meyer, especially pp. 453-6). Thermoplastic polyurethanes are derived from the reaction of polyester or polyether polyols with diisocyanates and optionally also from the further reaction of such components with chain-extending agents such as low molecular weight polyols, preferably diols, or with diamines to form urea linkages. Thermoplastic polyurethanes are generally composed of soft segments, for example polyether or polyester polyols, and hard segments, usually derived from the reaction of the low molecular weight diols and diisocyanates. While a thermoplastic polyurethane with no hard segments can be used, those most useful will contain both soft and hard segments.

In the preparation of the thermoplastic polyurethanes useful in the blends of the present invention, a polymeric soft segment material having at least about 500 and preferably from about 550 to about 5,000 and most preferably from about 1,000 to about 3,000, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08 more preferably 0.95 to 1.05, and most preferably, 0.95 to 1.00. In addition, monofunctional isocyanates or alcohols can be used to control molecular weight of the polyurethane.

Suitable polyester polyols include the polyesterification products of one or more dihydric alcohols with one or more dicarboxylic acids. Suitable polyester polyols also include polycarbonate polyols. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof, including small amounts of aromatic dicarboxylic acids. Suitable dihydric alcohols include ethylene glycol, 1,3- or 1,2-propylene glycol, 1,4-butanediol, 1,3-butanediol, 2-methylpentanediol-1,5, diethylene glycol, 1,5-pentanediol, 1,5-hexanediol, 1,2-dodecanediol, and mixtures thereof.

Further, hydroxycarboxylic acids, lactones, and cyclic carbonates, such as ε-caprolactone and 3-hydroxybutyric acid can be used in the preparation of the polyester.

Preferred polyesters include poly(ethylene adipate), poly(1,4-butylene adipate), mixtures of these adipates, and poly ε-caprolactone.

Suitable polyether polyols include the condensation products of one or more alkylene oxides with a small amount of one or more compounds having active hydrogen containing groups, such as water, ethylene glycol, 1,2- or 1,3-propylene glycol, 1,4-butanediol and 1,5-pentanediol and mixtures thereof. Suitable alkylene oxide condensates include those of ethylene oxide, propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide, 1,2-propylene oxide and/or tetrahydrofuran (THF). Alternatively, a THF polyether copolymer with minor amounts of 3-methyl THF can also be used.

Preferred polyethers include poly(tetramethylene ether) glycol (PTMEG), poly(propylene oxide) glycol, and copolymers of propylene oxide and ethylene oxide, and copolymers of tetrahydrofuran and ethylene oxide. Other suitable polymeric diols include those which are primarily hydrocarbon in nature, e.g., polybutadiene diol.

Suitable organic diisocyanates include 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-toluene diisocyanate, 2,6-toluene diisocyanate, isomeric mixtures of 2,4- and 2,6-toluene diisocyanate, 4,4'-methylene bis(phenylisocyanate ),2,2-diphenylpropane-4,4'-diisocyanate, p-phenylene diisocyanate, m-phenylene diisocyanate, xylene diisocyanate, 1,4-naphthylene diisocyanate, 1,5-naphthylene diisocyanate, 4,4'-diphenyl diisocyanate, azobenzene-4,4'-diisocyanate, m- or p-tetramethylxylene diisocyanate, and 1-chlorobenzene-2,4-diisocyanate. 4,4'-methylene bis(phenylisocyanate), 1,6-hexamethylene diisocyanate, 4,4'-dicyclohexylmethane diisocyanate and 2,4-toluene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isopropyl-a-glyceryl ether, 1,3-propanediol, 1,3-butanediol, 2,2-dimethyl- 1,3-propanediol, 2,2-diethyl- 1,3-propanediol, 2-ethyl-2-butyl-1,3-propanediol, 2-methyl-2,4-pentanediol, 2,2,4-trimethyl- 1,3-pentanediol, 2-ethyl- 1,3-hexanediol, 1,4-butanediol, 2,5-hexanediol, 1,5-pentanediol, dihydroxycyclopentane, 1,6-hexanediol, 1,4-cyclohexanediol, 4,4'-cyclohexanedimethylol, thiodiglycol, diethylene glycol, dipropylene glycol, 2-methyl-1,3-propanediol, 2-methyl-2-ethyl-1,3-propanediol, dihydroxyethyl ether of hydroquinone, hydrogenated bisphenol A, dihydroxyethyl terephthalate and dihydroxymethyl benzene and mixtures thereof. Hydroxyl terminated oligomers of 1,4-butanediol terephthalate can also be used, giving a polyester-urethane-polyester repeating structure. Diamines can also be used as chain extending agents giving urea linkages. 1,4-butanediol, 1,2-ethanediol and 1,6-hexanediol are preferred.

In the preparation of the thermoplastic polyurethanes, the ratio of isocyanate to hydroxyl should be close to unity, and the reaction can be a one step or a two step reaction. Catalyst can be used, and the reaction can be run neat or in a solvent.

The moisture content of the blend, in particular of the thermoplastic polyurethane, can influence the results achieved. Water is known to react with polyurethanes, causing the polyurethane to degrade, thereby lowering the effective molecular weight of the polyurethane and lowering the inherent and melt viscosity of the polyurethane. Accordingly, the drier the better. In any event, the moisture content of the blend, and of the individual components of the blend, should contain less than 0.2 percent by weight of water, preferably less than 0.1 percent, especially when there is no opportunity for the water to escape, for example during an injection molding process and other techniques of melt processing.

The thermoplastic polyurethane can also contain those additives, ingredients, and modifiers known to be added to thermoplastic polyurethane.

Component (c) Thermoplastic Crystalline Polymer Resin

The component (c) at least one thermoplastic crystalline polymer resin is selected from the group consisting of polypropylene, nylon 6, nylon 612, and certain polyalkylene terephthalates containing at least one of certain ethylene copolymers. Preferably, it is selected from the group consisting of polypropylene, nylon 6, and nylon 612.

Crystallinity in a thermoplastic polymer resin can be detected by any of several techniques readily available to those skilled in the art. Such techniques include the analysis for the presence of a crystalline melting point, as detected by Differential Scanning Calorimetry (DSC) or other thermal techniques, analysis for optical birefringance as measured by microscopic means, or analysis for x-ray diffraction effects typical of the crystalline state. It is noted that it is well known that although the thermoplastic resins described below are commonly referred to in the art as crystalline resins, these thermoplastic resins are known to be, in actuality, only partially crystalline and the fraction of crystallinity present in each thermoplastic resin can be changed somewhat by various processing conditions.

Polypropylene thermoplastic crystalline resin is well known in the art. It is commercially available or it can be prepared by techniques readily available to those skilled in the art. For example, polypropylene can be polymerized from propylene monomer or it can be copolymerized from ethylene monomer and other alpha-olefins. It is preferred that the polypropylene used in the blends herein have a minimum molecular weight of 10,000. The preferred maximum molecular weight is 100,000.

Nylon 6 thermoplastic crystalline resin is well known in the art. It is sold commercially or it can be made by techniques readily available to those skilled in the art. For example, it can be prepared by polymerizing caprolactam. The nylon 6 useful in the blends described herein preferably has a minimum molecular weight of 10,000 and a preferred maximum molecular weight of 100,000.

Nylon 612 thermoplastic crystalline resins, along with other nylon homo- and co-polymer thermoplastic crystalline resins having melting points below 250° C., are well known in the art. Such resins are commercially available or can be prepared by techniques readily available to those skilled in the art. For example, nylon 612 can be prepared by polymerizing adipic acid and dodecyldiamine. The preferred minimum molecular weight of the nylon 612 useful in the blends described herein is 10,000 and the preferred maximum molecular weight is 100,000. Other low melting crystalline nylons include nylon 610, nylon 10, nylon 12, nylon 1212, etc. Further, nylon 66 may be useful in the blends of the present invention if care is taken to prevent degradation of the other components of the blend during processing therewith.

The certain polyalkylene terephthalate thermoplastic crystalline resins containing at least one of certain ethylene copolymers useful herein are described in U.S. Pat. No. 4,753,980, incorporated herein by reference. Specifically, the polyalkylene terephthalates containing at least one ethylene copolymer described in U.S. Pat. No. 4,753,980 are specifically comprised of (a) 60–97 weight percent, preferably 65–95 weight percent, and most preferably 70–85 weight percent, of a polyester matrix resin having an inherent viscosity of at least 0.3, wherein the polyester matrix resin is selected from the group consisting of polyethylene terephthalate homopolymer, polybutylene terephthalate homopolymer, polyethylene terephthalate/polybutylene terephthalate copolymers, polyethylene terephthalate/polybutylene terephthalate mixtures, and mixtures thereof, and (b) 3–40 weight percent, preferably 5–35 weight percent, and most preferably 15–30 weight percent, of an ethylene copolymer of the formula

E/X/Y wherein

E is the radical formed from ethylene and comprises 40–90 weight percent of the ethylene copolymer, X is the radical formed from $$CH_2-\overset{R_2}{\underset{|}{CH}}-\overset{O}{\underset{\|}{C}}-O-R_1$$

where $R_1$ is alkyl of 2–8 carbon atoms, preferably 4–6 carbon atoms, and $R_2$ is H, $CH_3$, or $C_2H_5$, preferably H or $CH_3$, and X comprises 10–40 weight, preferably 15–35 weight percent, and most preferably 20–35 weight percent of the ethylene copolymer, and Y is selected from the group consisting of glycidyl methacrylate and glycidyl acrylate, preferably glycidyl methacrylate, and Y comprises 0.5–20 weight percent, preferably 2.0–10 weight percent, and most preferably 3–8 weight percent of the ethylene copolymer, and provided that the above-mentioned weight percents are based upon the total of component (a) and component (b) only.

The preferred polyester matrix resin is polybutylene terephthalate and the preferred ethylene copolymer is of the formula E/X/Y wherein E is ethylene, X is butyl acrylate, and Y is glycidyl methacrylate.

The inherent viscosity of the polyester matrix resin can be measured at a concentration of 0.32 grams/100 ml in trifluoroacetic acid(25)/methylene chloride(75) at 25°±0.10° C. It is computed by the formula $$\text{Inherent Viscosity} = \frac{\text{natural log}\left(\frac{\text{elution time of solution}}{\text{elution of solvent}}\right)}{C}$$

where C is the concentration expressed in grams of polymer per 100 ml of solution.

In addition to the polyester matrix resin and the ethylene copolymer, the polyalkylene terephthalates containing at least one ethylene copolymer useful herein can contain such additional ingredients as plasticizers, polyalkylene oxide soft segments, crystallization promoters, and reinforcing or filler materials. Each of these is described in more detail in U.S. Pat. No. 4,753,980.

The thermoplastic crystalline polymers described above are all known in the art. Further details on such thermoplastic crystalline polymer resins can be found in most general references on polymer chemistry, an example of which is the Modern Plastics Encyclopedia, published yearly by McGraw-Hill.

Other Components

It should be understood that the blends of the present invention can include, in addition to the polyacetal, the thermoplastic polyurethane, and the at least one thermoplastic crystalline polymer, other additives, modifiers, and ingredients as are generally used in polyacetal molding resins or in the individual components of the blend themselves, including stabilizers and co-stabilizers (such as those disclosed in U.S. Pat. Nos. 3,960,984; 4,098,843; 4,766,168; 4,814,397; and especially those disclosed in co-pending U.S. patent applications Ser. Nos. 07/327,664 and 07/366,558 (i.e., non-meltable polymer stabilizers containing formaldehyde reactive hydroxy groups or formaldehyde reactive nitrogen groups or both and stabilizer mixtures containing said polymer stabilizers); and Ser. Nos. 07/483,603 and 07/483,606 (i.e., microcrystalline or fibrous cellulose and stabilizer mixtures containing either type of cellulose)); antioxidants (especially amide-containing antioxidants such as N,N'-hexamethylenebis(3,5-di-tert-butyl-4-hydroxyhydrocinnamide and mixtures thereof), epoxy compounds, flame retardants, mold release agents, pigments, colorants, UV stabilizers (especially benzophenones and benzotriazoles and mixtures thereof), hindered amine light stabilizers (especially those containing triazine functionality), toughening agents, nucleating agents (including talc and boron nitride), glass, minerals, lubricants (including silicone oil), fibers (including polytetrafluoroethylene fibers), reinforcing agents, and fillers. It should also be understood that some pigments and colorants can, themselves, adversely affect the stability of polyacetal compositions but that the physical properties should remain relatively unaffected.

It is noted that polyacetal polymer can be readily de-stabilized by compounds or impurities known to de-stabilize polyacetal. Therefore, although it is not expected that the presence of these components or impurities in the present blends will exert a major influence on the toughness and elongation properties of the blend, it is recommended that if maximum stability, such as oxidative or thermal stability, is desired for the blend, then the components of the blend, along with any additives, modifiers, or other ingredients, should be substantially free of such de-stabilizing compounds or impurities. Specifically, for blends containing ester-capped or partially ester-capped polyacetal homopolymer, stability will be increased as the level of basic materials in the individual components and other ingredients/additives/modifiers of the blend is decreased. It is further noted that polyacetal copolymer or homopolymer that is substantially all ether-capped can tolerate higher concentrations of basic materials without decreasing stability than can ester-capped or partially ester-capped polyacetal homopolymer. Further, and again for maximum stability, but not for the retention of physical properties, blends containing either homopolymer or copolymer polyacetal will have increased stability as the level of acidic or ionic impurities in the individual components and other ingredients/additives/modifiers of the blend is decreased.

Method of Preparation

The blends of the present invention are preferably prepared by tumbling or mixing together pellets, or some other similar article, of the individual components, and then intimately melt blending the mixture in an intensive mixing device. The same can be done with a polyacetal/polyurethane pellet to be blended with the component (c) thermoplastic crystalline polymer. In other words, the components may be mixed and melt blended together individually or the component (c) thermoplastic crystalline polymer can be mixed and melt-blended with polyacetal/polyurethane pellets or other similar articles. It is also possible to prepare the blends by melting and mixing pellets of each individual component, or of the polyacetal/thermoplastic polyurethane composition with pellets of the thermoplastic crystalline polymer, in a molding machine, provided sufficient mixing can occur in the molding machine.

Regardless of the method used to make the blend, melt blending should be done by any intensive mixing device capable of developing high shear at temperatures above the softening points of the individual components, but also at temperatures below which significant degradation of the polymer blend components will occur. Examples of such devices include rubber mills, internal mixers such as "Banbury" and "Brabender" mixers, single or multiblade internal mixers with a cavity heated externally or by friction, "Ko-kneaders", multibarrel mixers such as "Farrell Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing such as valves, gates, or screws designed for this purpose. It is preferred to use a mixing device that will achieve intimate mixing the the greatest efficiency, consistency and evenness. Accordingly, continuous devices are preferred; and twin screw extruders, particularly those incorporating high intensity mixing sections such as reverse pitch elements and kneading elements, are especially preferred.

Generally, the temperature at which the blends are prepared is the temperature at which polyacetal is melt processed. Polyacetal compositions are usually melt processed at 170° C.-260° C., with 185° C.-240° C. being more preferred, and 200° C.-230° C. being most preferred. Melt processing temperatures below 170° C. or above 260° C. are possible if throughput is adjusted to compensate and if unmelted or decomposed product is not produced.

Shaped articles made from blends of the present invention can be made by any of several common methods, including compression molding, injection molding, extrusion, blow molding, melt spinning and thermoforming. Injection molding is especially preferred. Examples of shaped articles include sheet, profiles, rod stock, film, filaments, fibers, strapping, tape, tubing and pipe. Such shaped articles can be post treated by orientation, stretching, coating, annealing, painting, laminating and plating. Articles of the present invention can be ground and remolded.

Generally, the conditions used in the preparation of shaped articles will be similar to those described above for melt compounding. More specifically, melt temperatures and residence times can be used up to the point at which significant degradation of the composition occurs. Preferably, the melt temperature will be about 170° C.-250° C., more preferably about 185° C.-240° C., and most preferably about 200° C.-230° C. Generally, the mold temperature will be 10° C.-120° C., preferably 10° C.-100° C., and most preferably the mold temperature will be about 50° C.-90° C. Generally, total hold-up time in the melt will be about 3-15 minutes, with the shorter times being preferred, consistent with giving a high quality shaped article. If the total hold-up time in the melt is too long, the various phases can degrade and/or coalesce. As an example, the standard 0.32 cm ($\frac{1}{8}$ in) thick test specimen used in the Izod tests reported later in this application were, unless otherwise specified, prepared in a 1.5 ounce "Arburg" reciprocating screw injection molding machine, model 221-75-350 using cylinder temperature settings between 180° C.-210° C., with a mold temperature of 60° C., a back pressure of 0.3 MPa (50 psi), a screw speed of 120 rpm, a cycle of between 25-45 seconds injection/15 seconds hold, a ram speed of about 0.5-3 seconds, a mold pressure of 8-14 kpsi, and a general purpose screw. Total hold-up time of the melt was estimated to be about five minutes. Samples were allowed to stand for at least three days between molding and testing.

EXAMPLES

In the following examples, there are shown specific embodiments of the present invention and certain side-by comparisons with embodiments of control experiments where one or more of the parameters discussed above was chosen outside the range defining the limits of the present invention. It will be seen that the blends of the present invention are characterized by improved toughness and elongation. All parts and percentages are by weight, and all temperatures are in degrees Celsius unless otherwise specified. Measurements not originally in SI units have been so converted and rounded where appropriate.

The mixing device used in all of the examples of the present application, unless noted otherwise, is a 28 mm co-rotating Werner and Pfleiderer twin screw extruder, using a screw design containing two working sections with a total of five kneading elements (75 mm total), two reverse elements (24 mm total), and a vacuum port at about 70% of the distance from the feed throat to the die. It is noted that the design of the screw is not critical to the present invention. All zones were set at 190° C. Temperature of the melt coming out of the die was about 220° C.-260° C. A low flow of cooling water was used to reduce temperatures in some cases. The extruder was operated at 100-200 rpm with 10-25 pounds per hour throughput. A nitrogen blanket was maintained over the feed throat to exclude oxygen and insure dryness of the ingredients, each of which had been previously dried in a vacuum oven, and the strand exiting the die was quenched in water and cut into pellets. The melt temperatures indicated are estimates based upon measurements taken as the melt exited the die. Depending on the extruder configuration, there can be significant cooling between the last point of mixing and the die. Actual melt temperatures may have been somewhat higher.

The blends in the following examples consist of a polyacetal component, a thermoplastic polyurethane component, and at least one thermoplastic crystalline polymer component. Also included in the examples are comparative compositions of polyacetal and a thermoplastic crystalline polymer. Each individual component and blend is described below.

Polyacetal Polymer

Polyacetal polymer A used in the following examples was an acetate end-capped homopolymers prepared according to U.S. Pat. No. 2,998,409. Unless otherwise specified, polyacetal A contained less than one weight percent of a 33/23/43 terpolymer of nylon 66, nylon 6/10, and nylon 6, respectively, and less than one weight percent of a phenolic antioxidant. It is noted that the use of stabilizers and antioxidants is not necessary for the operability of the present invention. Where so used, they were used in the polyacetal of the following examples to improve thermal and oxidative stability and they do not exert a major influence on the toughness and elongation of the blends tested. Polyacetal A had a number average molecular weight of about 65,000.

Polyacetal polymer B used in the following examples was a polyoxymethylene dipolymer containing approximately 2 weight percent ethylene oxide.

Thermoplastic Polyurethane

The thermoplastic polyurethane A used in the blends of the examples below had an inherent viscosity of 1.33, a soft segment glass transition temperature (Tg) of $-35°$ C., and was comprised of 37% adipic acid, 39% butanediol, and 24% 4,4'-methylene bisphenyl isocyanate. Inherent viscosity was measured by ASTM D-2857 with a "Schott" automatic viscometer at 0.1.% polyurethane in dimethyl formamide at 30° C. The Tg was determined using a Du Pont Model 981 Dynamic Mechanical Analysis Cell attached to a Model 990 DTA instrument. The cell was modified to use liquid nitrogen as the coolant and to allow the use of a 3.2 cm (1.25 inch) gap holding the specimen. The oscillation amplitude was set at 0.2 mm. A heating rate of 2.5° C./min was used from $-170°$ C. to 0° to 40° C. depending on the signal amplitude. Readings were taken every 1° C. increment. The storage and loss moduli were plotted and the major loss modulus peak was defined as the soft segment glass transition temperature.

Thermoplastic Crystalline Polymer Resin

The component (c) at least one thermoplastic crystalline polymer resin used in the blends of the examples below was one of the following:

"6PAm" was a nylon 6 homopolymer having a melt viscosity at 240° C., 100 sec$^{-1}$ (measured in accordance with ASTM D3835-79, orifice 0.03×0.60 in., Kayeness melt rheometer) of 701 Pa sec. At 1000 sec$^{-1}$ the melt viscosity was 322 Pa sec.

"612PAm" was a nylon 612 homopolymer having a melt viscosity at 240° C., 100 sec$^{-1}$ (measured in accordance with ASTM D3835-79, orifice 0.03×0.60 in., Kayeness melt rheometer) of 358 Pa sec. At 1000 sec$^{-1}$ the melt viscosity was 1.87.

"PP" was a polypropylene homopolymer having a melt viscosity at 240° C., 100 sec$^{-1}$ (measured in accordance with ASTM D3835-79, orifice 0.03×0.60 in., Kayeness melt rheometer) of 919 Pa sec. At 1000 sec$^{-1}$, the melt viscosity was 167 Pa sec.

"PBT-e" was a polybutylene terephthalate containing an ethylene copolymer. The polybutylene terephthalate matrix resin had an inherent viscosity of 0.92, measured in m-cresol at 30° C. (0.1 grams/100 ml). It contained 17% of the ethylene copolymer toughener, which contained 70.5 weight percent ethylene, 28 weight percent butyl acrylate, and 1.5 weight percent glycidyl methacrylate.

"PET" was a polyethylene terephthalate resin having an inherent viscosity of 1.04 (measured in m-cresol at 30° C. and 0.1 grams/100 ml) and a melting point of 257° C. (measured by Differential Scanning Calorimetry, 10° C./minute). PET contained no ethylene copolymer.

Tests

The compositions of the examples that follow were all tested for elongation and toughness.

Elongation and toughness were measured on compositions prepared as follows: Unless otherwise specified, pellets of the melt-compounded composition were loaded into a 1.5 ounce "Arburg" reciprocating screw injection molding machine, model 221-75-350 using cylinder temperature settings of about 180° C.–210° C. on the rear, center, front, and nozzle (generally, between 180° C.–210° C. on the rear, center, and front and between 190° C.–210° C. on the nozzle), with a mold temperature of 60° C., a back pressure of 0.3 MPa (50 psi), a screw speed of 120 rpm, a cycle of 25–45 seconds injection/15 seconds hold, ram speed between about 0.5–3 seconds, mold pressure 8–14 kpsi, and a general purpose screw. Total hold-up time of the melt was estimated to be about five minutes. The melted composition was injection molded into standard 12.7 cm×1.27 cm×0.32 cm (5 in×½ in X ⅛ in) test bars that are used in measuring "Izod" toughness (according to ASTM-0256, Method A). Standard tensile bars of the same thickness were molded simultaneously in a two-cavity mold.

Elongation was measured in accordance with ASTM-D638 at 2"/min. Samples were allowed to stand three days at room temperature after molding and prior to testing. The value reported is the average of the value obtained on three test bars.

Toughness, reported as "Izod", was measured according to ASTM D-256, Method A. Samples were notched using a single toothed cutting wheel on a TMI Notching Cutter Model 43-15 with a cutter speed setting of 10.0 and a feed speed setting of 6.0. The samples were allowed to stand at room temperature three days after molding prior to testing. Since the relative humidity does not effect the physical properties of the sample significantly, no effort was made to control the specimens moisture content. The sample bar was cut in half with a notch in each half cut approximately 3.1 cm (1¼ in) from each end. Six samples of each composition were tested at room temperature and the average value was reported.

EXAMPLES 1–6

The components of the blends tested in examples 1–6 are described in the TABLE below. The results for each example showed that best toughness and elongation values were obtained when the blend contained the polyacetal polymer, the thermoplastic polyurethane, and the crystalline polymer, as opposed to those comparative blends that contained the polyacetal polymer and the crystalline polymer but not the thermoplastic polyurethane component (i.e., compare C1 v. 1, C2 v. 2, C3 v. 4, C4 v. 5, and C5 v. 6).

The results from examples C6 and C7 showed that improvements in toughness and elongation were only slight when the thermoplastic polyurethane component was added to a polyacetal/polyalkylene terephthalate blend wherein the polyalkylene terephthalate contained no ethylene copolymer component.

TABLE

| Example | Wt % PAc | Wt % TPU | Wt % Crystalline Resin | % Elongation (@ 2"/min) | Izod (ft-lbs/in) |
|---|---|---|---|---|---|
| C1 | 80A | 0A | 20 612PAm | 5 | 1.2 |
| 1 | 60A | 20A | 20 612PAm | 54 | 2.9 |
| C2 | 80A | 0A | 20 6PAm | 6 | 1.2 |
| 2 | 60A | 20A | 20 6PAm | 31 | 2.0 |
| 3 | 50B | 15A | 35 6PAm | 12 | 1.3 |
| C3 | 80A | 0A | 20 PP | 11 | 1.2 |
| 4 | 60A | 20A | 20 PP | 12 | 2.3 |
| C4 | 80A | 0A | 20 PBT-e | 14 | 0.9 |
| 5 | 60A | 20A | 20 PBT-e | 63 | 5.7 |
| C5 | 90A | 0A | 10 PBT-e | 14 | 1.0 |
| 6 | 80A | 10A | 10 PBT-e | 24 | 1.7 |
| C6 | 80B | 0A | 20 PET | 8 | 1.1 |
| C7 | 60B | 20A | 20 PET | 6 | 1.3 |

PAc = Polyacetal
TPU = Thermoplastic Polyurethane

I claim:
1. A blend consisting essentially of
   (a) 50–80 weight percent of a polyacetal polymer,
   (b) 10–20 weight percent of a thermoplastic polyurethane, and
   (c) 10–30 weight percent of at least one thermoplastic crystalline polymer selected from the group consisting of nylon 612, nylon 6, polypropylene, and polyalkylene terephthalates containing at least one ethylene copolymer,
wherein the above weight percents are based upon the total of components (a), (b), and (c) only.

2. The blend of claim 1 wherein the polyacetal polymer is a homopolymer.

3. The blend of claim 1 wherein the polyacetal polymer is a copolymer.

4. The blend of claim 1 wherein the thermoplastic polyurethane is derived from the reaction of a hydroxy terminated polyether, a diol chain extender, and a diisocyanate.

5. The blend of claim 1 wherein the thermoplastic polyurethane is derived from the reaction of a hydroxy terminated polyester, a diol chain extender, and a diisocyanate.

6. The blend of claim 1 wherein the at least one thermoplastic crystalline polymer component is selected from the group consisting of polypropylene, nylon 6, and nylon 612.

7. The blend of claim 1 wherein the at least one crystalline polymer is nylon 6.

8. The blend of claim 1 wherein the at least one crystalline polymer is nylon 612.

9. The blend of claim 1 wherein the at least one crystalline polymer is polypropylene.

10. The blend of claim 1 wherein the polyalkylene terephthalate containing at least one ethylene copolymer is comprised of
   (a) 60–97 weight percent of a polyester matrix resin having an inherent viscosity of at least 0.3, wherein the polyester matrix resin is selected from the group consisting of polyethylene terephthalate homopolymer, polybutylene terephthalate homopolymer, polyethylene terephthalate/polybutylene terephthalate copolymers, polyethylene terephthalate/polybutylene terephthalate mixtures, and mixtures thereof, and
   (b) 3–40 weight percent of an ethylene copolymer of the formula E/X/Y wherein
   E is the radical formed from ethylene and comprises 40–90 weight percent of the ethylene copolymer,
   X is the radical formed from

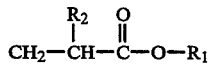

where $R_1$ is alkyl of 2–8 carbon atoms,
   $R_2$ is H, $CH_3$, or $C_2H_5$ and X comprises 10–40 weight percent of the ethylene copolymer, and
   Y is selected from the group consisting of glycidyl methacrylate and glycidyl acrylate and Y comprises 0.5–20 weight percent of the ethylene copolymer,
and wherein the above-stated weight percents are based upon the total of component (a) and component (b) only.

11. The blend of claim 10 wherein the ethylene copolymer is of the formula E/X/Y wherein E is ethylene, X is butyl acrylate, and Y is glycidyl methacrylate.

12. The blend of claim 10 wherein the polyalkylene terephthalate containing at least one ethylene copolymer additionally contains at least one of plasticizers, polyalkylene oxide soft segments, and crystallization promoters.

13. The blend of claim 1 further comprising at least one of stabilizers, co-stabilizers, antioxidants, epoxy compounds, flame retardants, mold release agents, pigments, colorants, UV stabilizers, toughening agents, nucleating agents, glass, minerals, lubricants, fibers, reinforcing agents, and fillers.

14. Shaped articles made from the blends of claim 1.

* * * * *